Patented Oct. 10, 1950

2,525,589

UNITED STATES PATENT OFFICE 2,525,589

DEHYDROGENATION OF POLYCHLOROETHANES BY MEANS OF CARBON TETRACHLORIDE

Oliver W. Cass, Niagara Falls, N. Y., assignor to E. I. du Pont de Nemours & Company, Wilmington, Del., a corporation of Delaware No Drawing. Application September 25, 1947, Serial No. 776,147

11 Claims. (Cl. 260—654)

This invention relates to the dehydrogenation of polychloro hydrocarbons to obtain useful products.

Compounds such as sym. tetrachloroethane and 1,2,2-trichloroethane may be converted by known multiple step methods to perchloroethylene and trichloroethylene, respectively, which are valuable commercial solvents. I have discovered a novel way of effecting the conversion of these polychloroethanes to the indicated products by a direct single step method in which the polychloroethanes are dehydrogenated by means of carbontetrachloride which is itself converted to a more valuable product.

It is an object of the invention to provide an improved method of converting sym. tetrachloroethane and 1,2,2-trichloroethane to perchloroethylene and trichloroethylene, respectively. Another object is a method of dehydrogenating sym. tetrachloroethane by means of carbon tetrachloride whereby perchloroethylene is obtained as the major product from both reactants. A further object is a method of dehydrogenating 1,2,2-trichloroethane by means of carbon tetrachloride whereby trichloroethylene and perchloroethylene are obtained as the chief reaction products. Still further objects will be apparent from the following description.

The above objects are accomplished in accordance with the invention by reacting sym. tetrachloroethane or 1,2,2-trichloroethane with carbon tetrachloride in the vapor phase at an elevated temperature in the presence of a porous surface active catalyst. I have discovered that such perchloroethylene is obtained as the major product when sym. tetrachloroethane is reacted in this manner and that when 1,2,2-trichloroethane is so reacted trichloroethylene and perchloroethylene constitute the chief reaction products.

The reactions involved are believed to occur as represented by the following equations:

(1) 
(2) 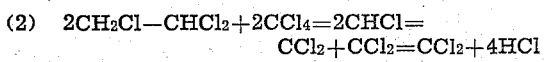

As indicated by the equations, the tetra- or trichloroethane is dehydrogenated to perchloroethylene or trichloroethylene, respectively, while in each reaction the carbon tetrachloride is converted to perchloroethylene. The net result in both reactions is that each reactant is converted to a more valuable product in a single step. Some hexachloroethane is formed as a by-product but the products indicated in the above equations constitute the chief reaction products.

The method may be conveniently carried out by passing the vapors of the reactants over a porous surface active material at a temperature of 400 to 600° C. and preferably 450 to 550° C. At temperatures below 400, the reaction does not proceed at a practical rate. Temperatures above 600° may be employed although such higher temperatures favor the formation of hexachloroethane, particularly when tetrachloroethane is a reactant. The product gases may be cooled to condense out liquid reaction products by known methods which products are then separated from the by-product, hydrogen chloride. The latter may be recovered in any desired manner, e. g. by water scrubbing to yield aqueous hydrochloric acid. Generally the reactants will be employed in approximately equimolar proportions but a substantial excess of either may be used. Large excesses of carbon tetrachloride enhance the formation of hexachloroethane and, therefore, are not generally desirable. In general, proportions corresponding to 0.8 to 1.5 moles of the polychloroethane per mole of carbon tetrachloride give good results although a more preferred range is 0.95 to 1.1 moles of polychloroethane per mole of carbon tetrachloride.

The rate of passage of the mixture of reactants through the reactor may be varied considerably. In general rates corresponding to 3 to 9 and preferably 4 to 7 kg. per liter of reactor volume per 24 hours are satisfactory. Such rates are calculated as though an unpacked reaction space were used.

Any porous surface active catalyst may be used, examples of which are: coke, charcoal, silica gel, metal oxide gels in general and unglazed porcelain. Activated carbon is particularly effective and is preferred.

The reactions will ordinarily be carried out at about atmospheric pressure but since pressure is not a critical factor, pressures substantially above or below atmospheric pressure may be employed successfully. The equipment may be conveniently constructed of stainless steel or nickel.

The invention is illustrated further by the following examples.

Example 1

The reactor consisted of a 40 mm. I. D. glass tube 2.5 feet long filled with granular activated carbon. The tube was placed in an electrically heated furnace in an upright position. 2.17 gram moles carbon tetrachloride and 2.17 gram moles sym. tetrachloroethane were mixed and fed into the reactor during the course of 2.66 hours while maintaining the temperature in the catalyst bed at 500 to 535° C. as measured by means of a thermocouple. The fore part of the reactor served as a vaporizer. Product gases were passed through a condenser to condense out liquid products and the by-product hydrogen chloride was scrubbed out by means of a water scrubber.

There were obtained a total of 4.08 moles of hydrogen chloride as an aqueous solution and 397.8 grams of liquid product. The latter when fractionally distilled yielded 1.273 moles of perchloroethylene, 1.018 moles of unreacted carbon tetrachloride, 0.047 mole of unreacted tetrachloroethane and 0.126 mole of hexachloroethane.

*Example 2*

A mixture of 3 gram moles of carbon tetrachloride and 2 gram moles of sym. tetrachloroethane was fed into the apparatus described in Example 1 at a uniform rate during 4.33 hours while maintaining the reactor temperature at 480 to 525° C. The reaction products were 3.93 moles of hydrogen chloride and 525 grams of a liquid product which on fractional distillation yielded 1.645 moles of carbon tetrachloride, 0.063 mole trichloroethylene, 1.275 moles perchloroethylene, 0.019 mole tetrachloroethane, 0.119 mole hexachloroethane and 0.082 mole of perchlorobutadiene. The reactor gained 102 grams in weight, primarily due to the accumulation therein of hexachloroethane. The unconverted tetrachloroethane and carbon tetrachloride could of course be recycled along with fresh materials in amounts sufficient to give the desired proportions of reactants.

*Example 3*

This example was carried out following the method of Example 1 employing 2 gram moles of carbon tetrachloroethane and 2 gram moles of 1,2,2-trichloroethane, the mixture of which was fed during 130 minutes. The reactor temperature was 470 to 540° C. The reaction products consisted of 5.79 moles of hydrogen chloride and a liquid product which yielded 0.374 mole carbon tetrachloride, 0.116 mole 1,2,2-trichloroethane, 0.187 mole trichloroethylene and 0.389 mole perchloroethylene. A total of 0.644 mole of hexachloroethane was obtained from the still residues and a deposit formed in the cool exit end of the reactor.

The present invention is of potential commercial value in that it provides a direct one step method for converting less valuable polychloroethanes to more valuable polychloroethylenes. Simultaneously, there is produced from carbon tetrachloride perchloroethylene which, of course, is much more valuable than carbon tetrachloride. The method of the invention gives best results when applied to the reaction involving sym. tetrachloroethane.

I claim:

1. A method of dehydrogenating a compound from the group consisting of sym. tetrachloroethane and 1,2,2-trichloroethane comprising reacting said compound with carbon tetrachloride in the vapor phase at a temperature of 400–600° C. in the presence of a porous surface active catalyst and in the absence of added elemental chlorine.

2. A method according to claim 1 wherein the catalyst is activated carbon.

3. A method according to claim 2 wherein 0.8 to 1.5 moles of the polychloroethane is employed per mole of carbon tetrachloride.

4. A method according to claim 3 wherein the polychloroethane employed is sym. tetrachloroethane.

5. A method according to claim 3 wherein the polychloroethane employed is 1,2,2-trichloroethane.

6. A method according to claim 1 wherein the reaction is carried out at 450–550° C.

7. A method according to claim 6 wherein 0.8 to 1.5 moles of the polychloroethane is employed per mole of carbon tetrachloride.

8. A method according to claim 7 wherein the catalyst is activated carbon.

9. A method according to claim 8 wherein the polychloroethane is sym. tetrachloroethane.

10. A method according to claim 8 wherein the polychloroethane is 1,2,2-trichloroethane.

11. A method according to claim 1 wherein the reaction is carried out at 450–550° C. employing the reactants in approximately equimolar proportions and the catalyst is activated carbon.

OLIVER W. CASS.

REFERENCES CITED

The following references are of record in the file of this patent:

UNITED STATES PATENTS

| Number | Name | Date |
|---|---|---|
| 2,139,219 | Basel et al. | Dec. 6, 1938 |
| 2,442,323 | Davis et al. | May 25, 1948 |
| 2,442,324 | Heitz et al. | May 25, 1948 |
| 2,447,410 | Hampel | Aug. 17, 1948 |